Sept. 12, 1961    C. W. PINKLEY    2,999,975
NUCLEAR MAGNETIC RESONANCE MEASURING AND CONTROL DEVICE
Filed March 3, 1958

INVENTOR
CLYDE W. PINKLEY

United States Patent Office 2,999,975
Patented Sept. 12, 1961

2,999,975
NUCLEAR MAGNETIC RESONANCE MEASURING AND CONTROL DEVICE
Clyde W. Pinkley, Columbus, Ohio, assignor to Industrial Nucleonics Corporation, a corporation of Ohio
Filed Mar. 3, 1958, Ser. No. 718,633
9 Claims. (Cl. 324—.5)

This invention relates to nuclear magnetic resonance measuring and control devices, and in particular to apparatus for improving the signal-to-noise ratio of the detector and amplifier stages employed in such devices.

It is well known in the prior art relating to nuclear physics that many atomic nuclei possess magnetic moment and nuclear momentum or "spin." A nucleus having these characteristics displays gyroscopic effects and is therefore often considered analogous to a spinning gyroscope having a magnet positioned along its axis.

When such nuclei are subjected to a unidirectional magnetic field, the spinning nuclei initially tend to precess around an axis parallel to the magnetic field. After a period of time, damping forces suppress the nuclear precession enabling the nuclear moments to line up with the magnetic field. In the event the polarized nuclei are subjected to a radio-frequency field at right angles to the magnetic field, nuclear precession is again initiated.

Prior investigators have studied the gyroscopic properties of nuclei by subjecting an element to a magnetic field produced by a permanent magnet and simultaneously irradiating the element with radio-frequency electromagnetic energy emanating from a tank coil. When the frequency of the radio-frequency source resonates with the frequency of nuclear precession, the spinning nuclei absorb a maximum amount of energy from the radio-frequency field thereby loading the tank circuit. It has been determined that the resonant frequency of nuclear precession varies for different elements and for different values of the polarizing magnetic field.

Within recent years, measuring devices have been proposed operative in response to the energy absorption occurring at the nuclear magnetic resonance frequency. From this absorption measurement, the relative proportion of an element in question can be determined because the total energy absorbed is a function of the number of nuclei present. Apparatus of this type can be used for the quantitative determination of any element the nucleus of which possesses angular momentum and magnetic moment, such as for example, hydrogen, helium, lithium, beryllium, boron, and nitrogen. Additionally, quantitative determination of various isotopes of elements can also be made, because in many cases the different isotopes have different resonant frequencies.

The absorption phenomenon of nuclear magnetic resonance is also used to measure constituent proportions in various compounds. For example, moisture content measurements can be made in materials, such as tobacco or paper. In such a determination the water content is not measured directly but, rather, indirectly by the amount of hydrogen present. By applying the same principles it is possible to measure the presence of any compound which contains at least one element the nucleus of which possesses angular momentum and magnetic moment.

In conventional nuclear magnetic resonance apparatus, radio-frequency current from a constant-current source is supplied to a parallel tuned circuit consisting of a coil and capacitor. The tank coil is placed within the uniform field of a permanent magnet so that the radio-frequency field is perpendicular to the magnetic field, and the material to be measured is placed within the coil.

The radio-frequency field, or the magnetic field, is modulated at a slow audio rate. When the radio-frequency and the magnetic fields satisfy the relation $\omega = \gamma H_0$, where $\omega$ is the angular velocity of the radio-frequency field, $H_0$ is the permanent magnetic field strength in gauss, and "$\gamma$" is a constant dependent on the type of nucleus subjected to resonance, nuclear magnetic resonance occurs.

The resulting energy absorption causes a decrease in the impedance of the tank circuit, and therefore a decrease in the voltage appearing across the tank circuit. For a given set of conditions the magnitude of this change in voltage is proportional to the amount of absorbing substance present so that a quantitative measurement can be made.

For purposes of analysis, the voltage appearing across the tank circuit may be considered as an amplitude-modulated radio-frequency carrier. In order that the amplitude of this modulation can be used as a quantitative measurement of the substance under test, appropriate apparatus must be connected to the tank circuit. The apparatus includes amplifier and detector stages incorporating electronic components.

In the usual arrangement the modulated voltage across the tank circuit is applied to a radio-frequency amplifier tuned to the carrier frequency. The output of this amplifier is in turn applied to an audio detector so that the modulated carrier may be demodulated. The audio output of the detector is in turn amplified in an audio-amplifier and thereafter applied to a readout circuit which may be an oscilloscope.

As may be readily appreciated, the amplitude of the modulation component occurring in response to nuclear absorption is relatively small and therefore the amplifiers and detectors are preferably designed so as to attain a high relative sensitivity. One of the factors limiting the sensitivity is the random noise generated by the vacuum tubes and other electrical components of the amplifiers and detectors. Sufficient material under test must therefore be excited to generate a signal greater than this noise level. A criterion for system performance is the ratio of the signal amplitude to the noise level with a ratio of one to one being the lower limit for measurement.

A principal object of this invention is to provide apparatus which gives a substantial increase in the signal-to-noise ratio of nuclear magnetic resonance measuring devices, thereby increasing the sensitivity and the accuracy of the measurement.

Another object of the invention is to provide an improved detector and audio-frequency amplifier for nuclear magnetic resonance measuring and control apparatus.

A preferred embodiment of this invention comprises a detector and audio amplifier unit having an input energized by the amplitude modulated carrier signal developed across a resonant tank circuit. The modulation component of the carrier is demodulated by two diode detectors each of which passes opposite alternations of the carrier. The respective audio output signals of these detectors are coincident in time, equal in absolute amplitude, and opposite in polarity. These output signals are applied to a differential amplifier which in turn generates an output responsive to the algebraic difference in the two detector signals. The output of the differential amplifier is a signal which is proportional to twice the amplitude of the signal otherwise obtained from conventional single half-wave detection.

Circuit noise generated in the diode detectors is of a random nature and therefore a phase difference exists between the noise arising in the two detectors. The resulting algebraic difference in the noise is therefore less than twice the noise of a single detector. A percentage increase in signal-to-noise ratio is therefore obtained over conventional detector and amplifier units.

Noise generated prior to the detector stages appears as amplitude modulation; however, there is a phase shift equal to one-half the period of the carrier between the modulation on the two envelopes so that a resulting percentage decrease in noise appears in the output of the differential amplifier.

In order that all of the features for attaining the objects of this invention may be readily understood, reference is herein made to the drawings wherein.

Figure 1:
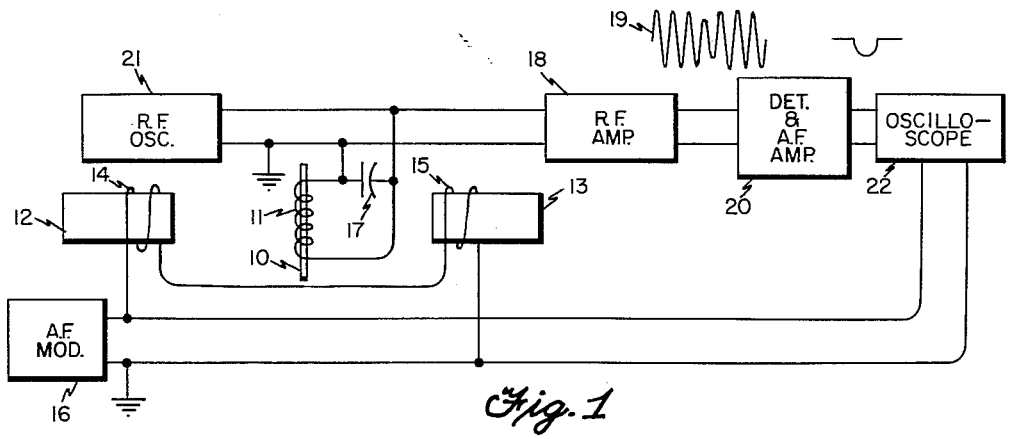
FIG. 1 is a simplified block diagram of conventional nuclear magnetic resonance measuring and control apparatus.

Referring now to FIG. 1, material 10 under test is positioned in the center of radio-frequency sampling coil 11, and is thereby subjected to a radio-frequency field parallel to the longitudinal axis of coil 11. Material 10 is also subjected to a transverse magnetic field developed in the gap between permanent magnets 12 and 13. Modulation coils 14 and 15 envelop the pole ends of magnets 12 and 13, respectively, so that the otherwise steady magnetic field is amplitude modulated by the audio-frequency energy supplied from modulation source 16.

Capacitor 17 shunts coil 11 so that the combination 11—17 forms a parallel-resonant tank circuit connected to the output of constant-current radio-frequency oscillator 21. The tank circuit is tuned to the oscillator frequency and therefore a substantial radio-frequency voltage appears across the combination 11—17. This voltage has a constant amplitude except during those periodic instances at which the output frequency of oscillator 21 and the modulated magnetic field generated by magnets 12 and 13 and modulation coils 14 and 15 satisfy the requirements for nuclear resonance.

During resonance, material 10 absorbs energy from the radio-frequency field so as to periodically load coil 11. As is well known, the loading of a parallel tank circuit lowers the "Q" of the tank, thereby reducing the parallel impedance and the voltage appearing across the tank. The periodic absorption of energy by material 10 amplitude modulates the radio-frequency voltage appearing across tank circuit 11—17. The amplitude of this modulation component varies in accordance with the number of nuclei present to absorb energy from tank coil 11.

Figure 2:
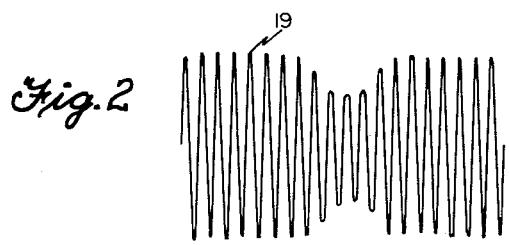
FIG. 2 is an enlarged view of the modulated carrier appearing at the output terminals of the radio-frequency amplifier of FIG. 1.

The voltage appearing across tank circuit 11—17 is applied to the input of radio-frequency amplifier 18. The signal output of radio-frequency amplifier 18, which corresponds to the waveform 19 shown in the enlarged view of FIG. 2, is in turn applied to the input of detector and audio frequency amplifier 20 which has an output connected to readout means 22. In a typical installation, readout means 22 may be an oscilloscope in which the vertical amplifier input terminals are connected to audio amplifier 20 and the oscilloscope sweep is synchronized by the audio-frequency voltage generated from modulation source 16. This arrangement, therefore, produces a fixed pulse on the oscilloscope screen that varies in amplitude in accordance with the quantity of absorbing substance of the material 10 under test.

The structural features of this invention are applicable to the detector and audio amplifier unit 20 shown in the system of FIG. 1. It should be understood, however, that the novel detector and audio amplifier unit may be incorporated in systems differing from the basic block diagram shown in FIG. 1. The essential requirement is that any such system generate an amplitude-modulated radio-frequency signal in response to the nuclear resonance phenomenon, and that the audio component of this signal is detected prior to readout.

Figure 3:
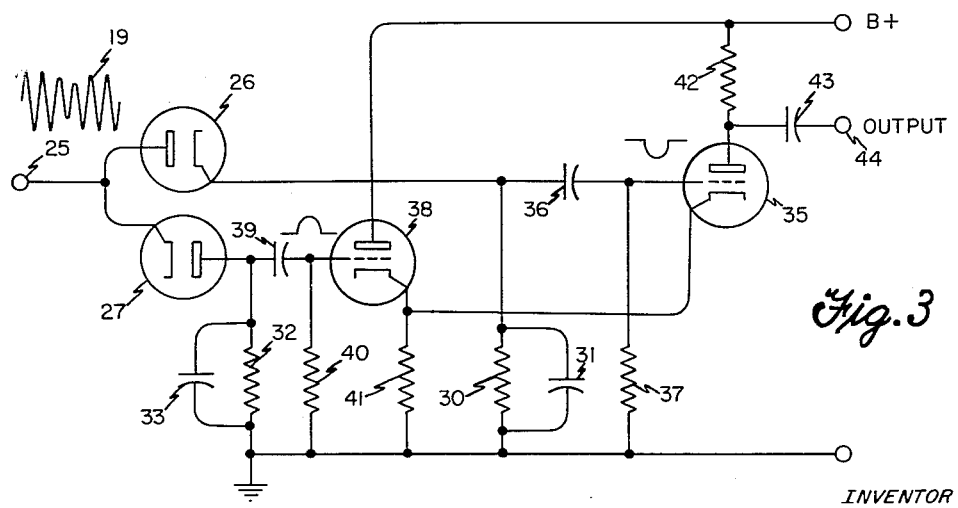
FIG. 3 is a schematic circuit diagram of a preferred embodiment of the detector and audio-frequency amplifier unit of this invention.

Referring now to the detailed circuit diagram of the detector and audio amplifier unit shown in FIG. 3, the modulated carrier 19 generated by radio-frequency amplifier 18 is applied between input terminal 25 and ground. Opposite alternations of this input signal are rectified by reversely connected diodes 26 and 27. In particular, diode 26 transmits positive alternations relative ground, and diode 27 transmits negative alternations relative ground.

The cathode of diode 26 is connected to ground through a load consisting of resistor 30 and its shunting capacitor 31, and the anode of diode 27 is connected to ground through a load consisting of resistor 32 and its shunting capacitor 33. In view of the fact that diode 26 presents a low impedance to positive alternations, a negative audio pulse is developed across the parallel combination 30—31 in response to the modulation component of the carrier. Likewise, a positive audio pulse is developed across the parallel combination 32—33. Both of these audio pulses are coincident in time and equal in absolute amplitude.

The positive pulse developed across combination 32—33 is applied to the control grid of cathode-follower tube 38 through coupling capacitor 39. The signal output developed across cathode resistor 41 is applied directly to the cathode of tube 35. Resistor 40 provides a grid return for the control grid of tube 38.

The negative pulse developed across combination 30—31 is applied to the control grid of tube 35 through coupling capacitor 36. Resistor 37 provides a grid return for the control grid of tube 35.

Inasmuch as a negative pulse is applied to the control grid of tube 35 and a positive pulse is applied to the cathode of this tube, tube 35 and associated components constitute a differential amplifier which develops an output signal across plate load resistor 42 that is proportional to the algebraic difference in the amplitudes of the two audio pulses applied to tube 35.

Capacitor 43 couples the output signal developed across resistor 42 to circuit read out means connected between terminal 44 and ground. In a preferred embodiment this readout means may be an oscilloscope, as is shown in FIG. 1. Terminal 44 is appropriately connected to an input terminal of the vertical amplifier of this oscilloscope. In the event that the horizontal sweep of the oscilloscope is synchronized by the audio-frequency modulator 16 shown in FIG. 1, a fixed pulse of varying amplitude will appear on the screen of the oscilloscope. The amplitude of this pulse is determined by the quantity of nuclear absorption in the sample 10 under test.

The detector and amplifier unit comprising tubes 26, 27, 35 and 38 greatly improves the signal-to-noise ratio over that attainable in conventional circuit arrangements used in nuclear magnetic measuring devices.

This desired circuit performance is attained inasmuch as noise and other spurious signals generated in the diode detectors 26 and 27, together with their associated components, is of a random nature. Therefore, a phase difference exists in the noise generated in the two detectors. Accordingly, the algebraic difference in the noise signals applied to the control grid and cathode electrodes of differential amplifier tube 35 is less than twice the noise of a single detector. However, the audio components applied to the control grid and cathode electrodes of differential amplifier tube 35 are coincident timewise and therefore the output signal appearing across load resistor 42 is proportional to twice the amplitude of each audio pulse developed by detector 26 or 27 in response to the nuclear resonance phenomenon. A percentage increase in signal-to-noise ratio is therefore obtained over conventional detector and amplifier units.

Noise generated prior to the detector stages appears as amplitude modulations; however, there is a phase shift equal to one-half the period of the carrier between the modulation in the two envelopes so that a resulting percentage decrease in noise appears in the output of the differential amplifier.

It should be understood that the above described arrangements are merely illustrative of the principles of this invention and that numerous other modifications may be provided without departing from the scope of the invention.

What is claimed is:

1. In nuclear magnetic resonance measuring apparatus for subjecting a material to be analyzed to mutually perpendicular magnetic and radio-frequency fields including a resonant tank circuit developing a voltage responsive to a condition of nuclear resonace between the fields and for the material being measured, the improvement comprising a radio-frequency amplifier driven by the amplitude-modulated, radio-frequency signal developed by said tank circuit during nuclear resonance, a pair of diode detectors driven by the output of said radio-frequency amplifier and each including a serially-connected, half-wave rectifier and a load impedance, said rectifiers being oppositely poled relative one another whereby the audio voltages developed across said load impedances have opposite polarities with respect to ground, a differential amplifier including a vacuum tube having anode, cathode and control grid electrodes, a cathode-follower including a vacuum tube having anode, cathode and control grid electrodes and applying the follower output to the cathode of the amplifier, means applying the audio voltage developed across one of said load impedances to the cathode-follower input and the audio voltage developed across the other load impedance to the control grid of said differential amplifier with said amplifier cathode and control grid electrodes being driven in opposite polarity directions relative one another, and a common output impedance connected to the anode of said audio amplifier so that an audio signal is produced at the amplifier output signal which is proportional to the algebraic difference of the two audio signals applied to the differential amplifier.

2. In nuclear magnetic resonance measuring apparatus for subjecting a material to be analyzed to mutually perpendicular magnetic and radio-frequency fields including a resonant tank circuit developing an amplitude-modulated, radio-frequency voltage responsive to a condition of nuclear resonance between the fields and for the material being measured, the improvement comprising a pair of diode detectors driven by said tank circuit voltage and each including a serially-connected, half-wave rectifier and a load impedance rectifying opposite alternations of said voltage, a differential amplifier including a vacuum tube having anode, cathode and control grid electrodes, a cathode-follower including a vacuum tube having anode cathode and control grid electrodes and applying the follower output to the cathode of the amplifier, means applying the audio voltage developed across one of said load impedances to the cathode-follower input and the audio voltage developed across the other load impedance to the control grid of said differential amplifier with said amplifier cathode and control grid electrodes being driven in opposite polarity directions relative one another, and a common output impedance connected to the anode of said audio amplifier so that an audio signal is produced at the amplifier output which is proportional to the algebraic difference of the two audio signals applied to the differential amplifier.

3. In nuclear magnetic resonance measuring apparatus for subjecting a material to be analyzed to mutually perpendicular magnetic and radio-frequency fields including a resonant tank circuit developing a voltage responsive to a condition of nuclear resonance between the fields and for the material being measured, the improvement comprising a radio-frequency amplifier driven by the amplitude-modulated, radio-frequency signal developed by said tank circuit during nuclear resonance, a pair of diode detectors driven by the output of said radio-frequency amplifier and each including a serially-connected, half-wave rectifier and a load impedance, said rectifiers being oppositely poled relative one another whereby the audio voltages developed across said load impedances have opposite polarities with respect to ground, and a differential amplifier driven by said audio voltages and developing an output signal which is proportional to the algebraic difference of the two audio signals applied to the differential amplifier.

4. In nuclear magnetic resonance measuring apparatus for subjecting a material to be analyzed to mutually perpendicular magnetic and radio-frequency fields including a resonant tank circuit developing a voltage responsive to a condition of nuclear resonance between the fields and for the material being measured, the improvement comprising means developing an audio signal responsive to the amplitude-modulated positive signal alternations of said tank circuit voltage, means developing a second audio signal independent of said first audio signal and responsive to the negative signal alternations of said tank circuit voltage, and an amplifier driven by both of said audio signals and developing an output proportional to the algebraic difference in the amplitudes of the two audio signals.

5. In nuclear magnetic resonance measuring apparatus for subjecting a material to be analyzed to mutually perpendicular magnetic and radio-frequency fields including a resonant tank circuit developing a voltage responsive to a condition of nuclear resonance between the fields and for the material being measured, the improvement comprising a pair of diode detectors connected to said tank circuit and each developing an audio signal in response to opposite alternations of the amplitude-modulated radio-frequency voltage developed in said tank circuit, a differential amplifier, and a network interconnecting said diode detectors and said differential amplifier and applying both of the audio signals of said detectors to said amplifier so that a signal is produced at the amplifier output responsive to the algebraic difference of said audio signals.

6. In nuclear magnetic resonance measuring apparatus for subjecting a material to be analyzed to mutually perpendicular magnetic and radio-frequency fields including a resonant tank circuit developing a voltage responsive to a condition of nuclear resonance between the fields and for the material being measured, the improvement comprising a pair of detectors driven by said tank circuit voltage and each developing an audio signal in response to opposite alternations of the amplitude-modulated radio-frequency voltage developed in said tank circuit, a differential amplifier, and a network interconnecting said detectors and said differential amplifier and applying both of the audio signals of said detectors to said amplifier so that a signal is produced at the amplifier output responsive to the algebraic difference of said audio signals.

7. In nuclear magnetic resonance measuring apparatus for subjecting a material to be analyzed to mutually perpendicular magnetic and radio-frequency fields including a resonant tank circuit developing a voltage responsive to a condition of nuclear resonance between the fields and for the material being measured, the improvement comprising a pair of detectors driven by said tank circuit voltage and each developing an audio signal in response to opposite alternations of the amplitude-modulated radio-frequency voltage developed in said tank circuit, a differential amplifier, and a network interconnecting said detectors and said differential amplifier and applying both of the output voltages of said detectors to said amplifier.

8. In nuclear magnetic resonance measuring apparatus for subjecting a material to be analyzed to mutually perpendicular magnetic and radio-frequency fields including a resonant tank circuit developing a voltage responsive to a condition of nuclear resonance between the fields and for the material being measured, the improvement comprising a pair of diode detectors driven by said tank circuit voltage and each developing an audio signal of opposite polarity relative the other in response to opposite alternations of the amplitude-modulated radio-frequency voltage developed in said tank circuit, a differential amplifier, and a network interconnecting said diode detectors and said audio amplifier and applying both of the output voltages of said detectors to said amplifier.

9. An improved detector and audio-frequency amplifier for an amplitude-modulated radio-frequency signal, comprising a pair of diode detectors driven by said signal and each including a serially-connected, half-wave rectifier and a load impedance rectifying opposite alternations of said signal, a differential amplifier including a vacuum tube having anode, cathode and control grid electrodes, a cathode follower including a vacuum tube having anode, cathode and control grid electrodes and applying the follower output to the cathode of the amplifier, means applying the audio voltage developed across one of said load impedances to the cathode-follower input and the audio voltage developed across the other load impedance to the control grid of said differential amplifier with said amplifier cathode and control grid electrodes being driven in opposite polarity directions relative one another, and a common output impedance connected to the anode of said audio amplifier so that an audio signal is produced at the amplified output which is proportional to the algebraic difference of the two audio signals applied to the differential amplifier.

References Cited in the file of this patent

UNITED STATES PATENTS

| | | |
|---|---|---|
| Re. 23,950 | Block | Feb. 22, 1955 |
| 2,147,940 | Toennies | Feb. 21, 1939 |
| 2,222,759 | Burnside | Nov. 26, 1940 |
| 2,450,818 | Vermillion | Oct. 5, 1948 |
| 2,509,337 | Earp | May 30, 1950 |

FOREIGN PATENTS

| | | |
|---|---|---|
| 145,785 | Australia | Mar. 18, 1952 |

OTHER REFERENCES

Andrew: Nuclear Magnetic Resonance, Cambridge University Press, London 1955, pp. 35, 36, 56, 57 and 58 relied on.